United States Patent Office 3,510,446
Patented May 5, 1970

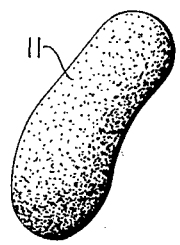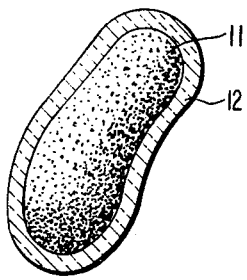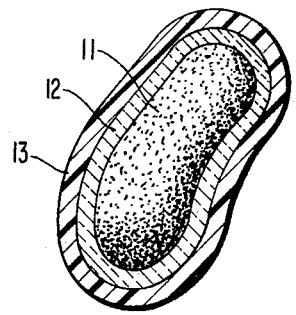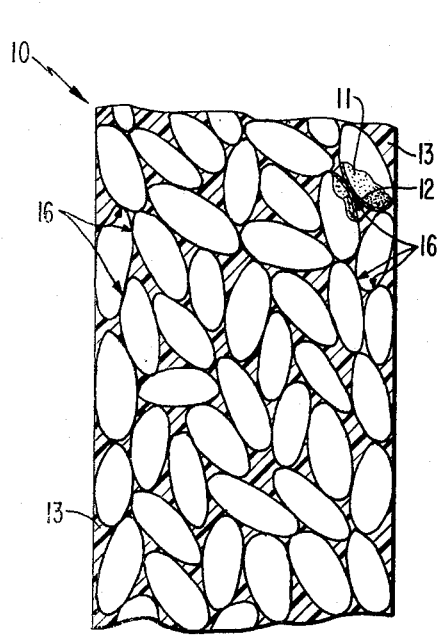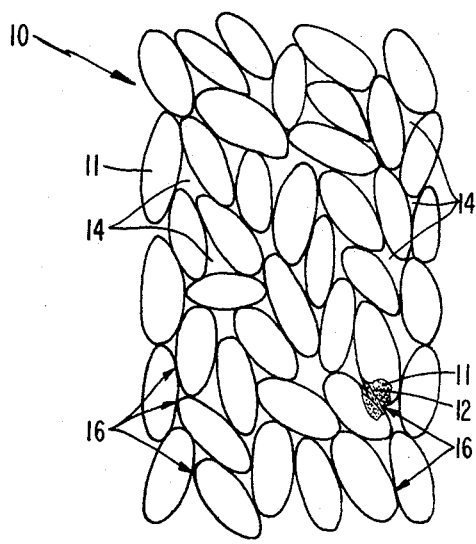

3,510,446
FIRE-PREVENTIVE STRUCTURAL MATRIX AND PROCESS OF MAKING THE SAME
Hans Jünger and Franz Weissenfels, Siegburg, Germany, assignors to Dynamit Nobel Aktiengesellschaft, Troisdorf, Germany
Continuation-in-part of application Ser. No. 521,497, Jan. 19, 1966. This application May 16, 1968, Ser. No. 729,643
Int. Cl. C08g 51/04
U.S. Cl. 260—38                        15 Claims

ABSTRACT OF THE DISCLOSURE

A fire-spreading preventive structural matrix is formed by (1) wetting a plurality of oxide-containing inorganic particles with a heat stabilizing agent containing a boron or silicon substance capable of forming an enamel-like reaction product with the particles at elevated temperatures, (2) packing the particles in an array so that each particle-to-particle contact site is bridged by the heat stabilizing agent, and (3) filling the interstices between the particles with a synthetic resin binding material to bind the particles in their positions in the array, and thereby fix the configuration of the structural matrix formed therefrom.

---

The present application is a continuation-in-part of an earlier filed application having the Ser. No. 521,497, filed by Hans Jünger and Franz Weissenfels on January 19, 1966, now abandoned, and entitled "Heat-Stabilized Building Materials and Process of Providing the Same."

BACKGROUND OF THE INVENTION

This invention relates to heat stabilized, structural matrices which prevent the spreading of fires and to a process for providing the same. More particularly, it relates to a process for improving the form stability and load bearing capacity of structural matrices, such as wall boards, insulation panels, construction blocks, and the like, which have been subjected to fire and/or highly elevated temperatures. Even more particularly, the invention relates to a process for improving the heat stability, load bearing capacity and fire-spreading preventive qualities of wall boards and other structural matrices fabricated from oxide-containing inorganic particles, such as exfoliated clay, exfoliated mica and the like, and from synthetic resin binders, by incorporating therein, in a novel manner, certain chemically bound boron or silicon substances; and the novel and improved structural matrices formed thereby.

According to DIN 4102, it is known to classify building materials with respect to their resistance to fire and heat. In this connection, it is of interest to know not only whether a material is combustible, difficulty inflammable, or non-combustible, but it is also of interest and importance to obtain information with regard to the inherent form stability of such building materials under the action of fire and/or high temperatures. Obviously, a structural part which essentially retains its form at high temperatures can hinder and delay, if not even entirely prevent, for example, the spreading of a fire.

Structural parts made from oxide-containing inorganic substances, such as inflated or blown (exfoliated) clay, mica and slate, pumice, etc., as well as binding agents made from synthetic resins, such as phenol resins, epoxy resins, etc., are used in the modern technology of the building industry. However, the organic component of these substances, i.e., the synthetic resin binder, has the disadvantage of being relatively easily susceptible to burning. Accordingly, under the prolonged action of fire and/or heat of, for example, 15 to 20 minutes, such building parts disintegrate due to the fact that the cohesion or mechanical resistance thereof is lost as a result of the burning of the synthetic resin binder.

The burning and deterioration of the synthetic binder material, and the consequent disintegration of the structural parts or matrices, has not gone unnoticed, nor completely unchecked in the art, and several techniques have been suggested for reducing the significance of this problem. For example, it has been found that the inherent form-stability of parts or structural matrices made from oxide-containing inorganic substances and synthetic resin binders at high temperatures and/or under the action of fire may be improved by (1) employing a boron-containing synthetic resin as binding agent, or (2) using a non-boron-containing synthetic resin as binding agent and adding thereto, prior to the use thereof, alkali metal silicates, silicic acid esters, boric acids and the salts thereof, triphenyl borate, or other boron compounds which combine with oxide-containing inorganic materials under the action of heat. However, although the use of high temperature binders (silicic acid esters, alkali metal silicates, boron compounds, etc.) in conjunction with low temperature binders (phenolic resins, and other synthetic resins) has somewhat improved the heat stability of the structural matrices formed therewith, the prior art techniques of employing the combination of high and low temperature binders have not been completely adequate.

SUMMARY OF THE INVENTION

Accordingly, it is an object of the present invention to provide a process for improving the heat stability, load bearing capacity, and fire-spreading preventive properties of wall boards, construction blocks, and other structural matrices which overcomes the disadvantages and deficiencies of the prior art.

Another object of the present invention is to provide a structural matrix which affords improved form stability and which retains its ability to withstand loads and stresses when subjected to the action of fire and/or heat.

A further object of the invention is to provide a process for providing a new and improved structural matrix which is highly heat stable and which is capable of preventing the spreading of fires.

A still further object is to provide a process for improving the heat stability of structural matrices made from oxide-containing inorganic particles, such as exfoliated clays, which may be carried out in an efficacious manner.

Thus, in accordance with the principles of the present invention, these and other objects are accomplished by wetting a plurality of oxide-containing inorganic particles, which form the bulk of the structural matrix and which support any loads placed thereon, with a heat stabilizing agent containing a chemically bound boron or silicon substance capable of reacting with the particles under the influence of heat and/or fire to form an enamel-like, fire resistant product thereon. The wetted particles are formed into a packed array so that substantially all of the particles engage at least one other particle, and so that each site of particle-to-particle contact is bridged by the heat stabilizing agent, or otherwise interconnected thereby. The physical configuration and arrangement of the packed array of wetted particles, having spaces or interstices between engaging particles thereof, is then fixed or rigidified by filling the interstices with a phenolic resin, epoxy resin, or any other suitable synthetic resin binding material. The structural matrix formed in the above-described manner is heat resistant and form stable and is characterized by an ability to withstand considerable loads and stress, even after being subjected to the action of heat and/or fire.

BRIEF DESCRIPTION OF THE DRAWING

The above-described objects and other objects and advantages of the present invention will become apparent to those skilled in the art from a consideration of the following specification and claims, when taken in conjunction with the drawing, wherein:

FIG. 1 to 3 are schematic views depicting a single particle of a heat-resistant and form stable oxide-containing inorganic substance, embodying certain principles of the present invention (FIG. 1), the same particle wetted with a heat stabilizing agent containing a chemically bound boron or silicon substance that will react with the particle at elevated temperatures (FIG. 2), and the wetted particle encompassed by a synthetic resin binding material (FIG. 3), respectively;

FIG. 4 is a schematic view of a portion of a structural matrix, embodying the principles of the present invention, illustrating the configuration thereof and the manner in which the individual particles thereof are bonded together before the matrix is subjected to the action of fire and/or heat; and FIG. 5 is a schematic view of the structural matrix shown in FIG. 4, illustrating the configuration thereof and the manner in which the individual particles thereof are bonded together after the action of fire and/or heat.

DETAILED DESCRIPTION OF THE INVENTION

In accordance with the present invention, it has been found that the form-stability and fire-spreading preventive properties of wall boards, insulation panels, construction blocks and the like, made from oxide-containing inorganic materials and from low temperature synthetic resin binders, may be considerably enhanced by first wetting the particles of oxide-containing inorganic material (heat stabilizing agent), such as a solution or suspension of alkali metal silicates or silicic acid esters, and then packing the particles in an array and bonding them together with a low temperature binding material (synthetic resin binder) so that every particle contacts or engages at least one other particle, and so that the high temperature binding material bridges or otherwise interconnects substantially every particle-to-particle contact site.

Referring now to the drawing, and particularly to FIGS. 1–3, there is shown one of a plurality of oxide-containing inorganic particles 11 which, when bound in a packed array with a heat stabilizing agent 12 and a synthetic resin binding material 13, acts as the weight supporting, stress bearing and fire-spreading preventive constituent of a structural matrix 10 formed therefrom in accordance with the principles of the present invention. The oxide-containing inorganic particles 11 suitable for use in the structural matrix 10 must be heat-resistant, substantially form-stable when admixed with the binders employed to secure the particles 11 in the fixed array in the matrix 10, and capable of reacting with the heat stabilizing agent 12 (high temperature binder) under the action of heat and/or fire to form an enamel-like product which in turn, possesses an ability to bind the particles 11 in place to prevent the matrix 10 from crumbling or disintegrating after the synthetic resin 13 (low temperature binder) has been burned away or otherwise removed from the matrix by the action of heat. Although the particles 11 need not be of uniform size, nor of any specific configuration, they must be of sufficient size to bear the considerable loads and stresses required of structural matrices and, even more importantly, they must be of sufficient size to enable a proper mixing of the particles 11 with the binders 12 and 13 so that substantially every particle is wetted by the heat stabilizing agent 12, and so that there is no danger that aggregates or lumps of improperly or inadequately wetted particles will be formed. In this regard, the minimum grain size of the particles is about 1 mm., while grain sizes of from about 5 to 30 mm. are preferred. In addition, it is preferred that the particles 11 be porous or exfoliated to decrease the density of the particles themselves and, hence, the density of the structural matrix 10 formed therefrom. Illustrative of the oxide-containing inorganic materials suitable for the practice of the present invention are inflated exfoliated clays, exfoliated mica, exfoliated slate, exfoliated pumice and exfoliated perlite, each having a grain size of at least 1 mm. The type of synthetic resin binders 13 useful in practicing the invention is not critical and suitable resin binders include phenol-formaldehyde resol resins, urea-formaldehyde resins, phenolic resins containing chemically bound boron, and the like.

In one embodiment of the principles of the invention, the above-described particles 11 are admixed with, and thus wetted by, a heat stabilizing agent (see FIG. 2) containing a chemically bound boron or silicon material which, it is believed, reacts with the particles under the action of high temperatures and/or fire to form a flame-resistant, enamel-like material which functions as a secondary binding material between engaged particles after the synthetic resin 13 (primary binding material) is removed by combustion. In this regard, chemically bound boron or silicon containing materials suitable for the practice of the present invention include alkali metal silicates, silicic acid esters, triphenyl borate, boric acid and the salts thereof, or other boron or silicon compounds capable of reacting with the particles 11, in the above-described manner.

After the particles 11 are wetted by the heat stabilizing agent 12, they are packed in an array in which substantially every particle engages at least one other particle, and in which substantially every site 16 of particle-to-particle engagement is bridged with the heat stabilizing agent. Then, as illustrated in FIG. 4, the spaces or interstices 14 between the engaged particles 11 are filled with the synthetic resin binding material 13 which, upon hardening, functions as the primary or low temperature binding material which secures the particles in place in the array thereof to fix the configuration and the dimensions of the structural matrix 10 formed therefrom. When the structural matrix 10, formed in accordance with the above-described procedure, is subjected to the action of heat and/or fire, the engaged particles 11, as depicted in FIG. 5, become bonded at each site 16 of particle-to-particles engagement by the resultant fire-resistant, enamel-like reaction product of the particles and the heat stabilizing agent 12, in bridging engagement thereon, the enamel-like product functioning as a secondary binding material. In addition, the hardened synthetic resin 13 is combusted or otherwise deteriorated by the action of the heat and/or fire so that the primary or low temperature bond is completely destroyed, leaving the particles 11 firmly bound together by only the secondary bonds of the sites 16 of particle-to-particle engagement. In this connection, it will be appreciated that the large number of bridged sites 16, related to the size of the particles, the manner in which they are wetted with the heat stabilizing agent 12, and the manner in which they are packed in the array thereof, provides a large number of secondary bond sites and eliminates a need for having to first shift the particles into engagement prior to forming the secondary or high temperature bonds. Thus, even after exposure to the action of heat and/or fire, and even after the destruction of the synthetic resin or primary binding material, the matrix 10 is still able to bear considerable loads and stresses, still able to withstand the effects of the heat and/or fire, and still able to prevent the spreading of fire from one side of the matrix to the other.

In another embodiment of the principles of the present invention, the particles 11 are first admixed and wetted with the heat stabilizing agent 12, as discussed above and illustrated in FIG. 2. Then, as illustrated in FIG. 3, the wetted particles are admixed and coated with a layer of synthetic resin 13. In this regard, it will be appreciated that it is readily possible to determine and set, by virtue of the viscosity of the heat stabilizing agent 12 and of the synthetic resin 13, and respectively, of the solutions and suspensions thereof or the like, the amount of heat stabilizing agent (secondary binding material) and synthetic resin (primary binding material) adhering to the particles, in dependence upon the respectively existing requirements. Next, the particles 11 which are enclosed in this manner with two still more or less flowable layers are poured into a mold in which they are pressed together to force the heat stabilizing agent 12 and the synthetic resin 13 to move aside and to force the particles to strike directly against each other at random points, whereupon the synthetic resin material is hardened to form the primary or low temperature bonds between the particles and to fix the dimension of the structural matrix 10 formed therefrom.

The following examples are given merely as illustrative of the present invention and are not to be considered as limiting thereof.

EXAMPLE I

The following ingredients are combined in a mixer:

28.00 kilograms of exfoliated clay (screening fraction, i.e., grain size, 10–15 mm.)
4.20 kilograms of a phenol-formaldehyde resol resin binder
0.84 kilogram of approximately 50% aqueous paratoluene sulfonic acid solution This mixture is subsequently filled into a box mold having a top cover or lid. The cover is closed after filling. The mold has a surface area of 100 x 100 cm. and a height of 12 cm. The mixture is hardened in the mold at 60° C. for 4 hours to give a porous structure A. The resistance to pressure of a test sample taken therefrom and having an edge length of 10 cm. is 5.7 kp./cm.$^2$.

The same structure is prepared once again, however, this time 25% by weight (1.05 kilograms) of boric acid in very finely pulverized form is added to the phenol resin binder (structure B). The resistance to pressure of a test sample taken from structure B, of equal size as that taken from structure A, is 4.8 kp./cm.$^2$.

Cubes having an edge length of 10 cm. are taken from structures A and B and exposed to a full, nonluminous Bunsen burner flame for 30 minutes. After such exposure to the flame, cube A had no resistance left whatsoever and disintegrated partly while still exposed to the flame and partly when touched later thereto. Cube B displayed no disintegration while exposed to the flame and, after cooling, still had a resistance to pressure of 1.4 kp./cm.$^2$.

EXAMPLE II

In a manner analogous to Example I, molded articles are made from the following exfoliated clay-binder combination:

28.0 kilograms of exfoliated clay (screening fraction, 10–15 mm.)
5.7 kilograms of binding agent consisting of:
    3.8 kilograms of a phenol resin containing chemically bound boron, very finely pulverized
    1.9 kilograms of 1,4-butanediol diglycidyl ether The molded parts are hardened over a period of 12 hours at 50° C. The resistance to pressure of the material is 7.0 kp./cm.$^2$. Three test cubes having an edge length of 10 cm. are exposed to a full Bunsen burner flame for 15 minutes. They are inherently stable both during and after the exposure to the flame and, after cooling, still have a resistance to pressure of 1.8 kp./cm.$^2$.

EXAMPLE III

In a manner analogous to that described in Example I, molded structures are made from the following exfoliated clay-binder combination:

28.0 kilograms of exfoliated clay (screening fraction, 10–15 mm.)
6.5 kilograms of binding agent consisting of:
    5.0 kilograms of a urea-formaldehyde resin
    0.5 kilogram of potassium bisulfate
    1.0 kilogram of sodium tetraborate, very finely pulverized Molded parts are made from this mixture by hardening the same for 24 hours at room temperature and then for 8 hours at 50° C. The resistance to pressure of test cubes taken from these parts, having an edge length of 10 cm., is on the average of 5.2 kp./cm.$^2$. Test samples thereof stored in a muffle furnace for 15 minutes at 800° C. displayed no disintegration whatsoever and have absolutley no loss in their inherent form-stability. The resistance to pressure of the cubes measured after cooling thereof is 1.8 kp./cm.$^2$.

The same parts made according to the formulation of this example but without the addition of the borate compound disintegrate partly during the 15 minute exposure at 800° C. and completely when an attempt is made to remove the molded parts from the furnace.

EXAMPLE IV

The following components are mixed with each other in a mixer:

28.0 kilograms of exfoliated clay (screening fraction, 10–15 mm.)
5.6 kilograms of binding agent consisting of:
    4.5 kilograms of potassium silicate (27° Baumé)
    1.1 kilograms of kaolin The box mold described in Example I is filled with this mixture. Hardening of the mixture to a spongy or porous formed structure takes place over a period of 5 hours at 80° C. The following phenol resin mixture, which is capable of foaming at room temperature, is then poured uniformly onto the molded structure:

3.6 kilograms of a foamable phenol-formaldehyde resol resin
0.45 liter of monofluorotrichloromethane foaming agent
0.45 liter of a hardener liquid consisting of sulfuric acid, para-toluenesulfonic acid and water After this mixture is poured onto the molded structure, the mold is closed with a lid weighing 3 tons. The foamed material penetrates into the cavities and interstices between the particles of clay of the porous molded structure which are accessible thereto and hardens within a period of about 2 hours. Thereafter, the finished structure is removed from the mold (structural matrix A). This structure displays an average resistance to pressure of 12.1 kp./cm.$^2$.

Another structural matrix is prepared in the same manner, but instead of the potassium silicate-kaolin mixture, 4.2 kilograms of phenol resin binder (P600) and 0.84 kilogram of hardener (Haerter TW) are employed as the binding agent. The resistance to pressure of this structure (structural matrix B) is 9.3 kp./cm.$^2$.

Subsequently, test cubes having an edge length of 10 cm. from matrices A and B are exposed to a full, nonluminous Bunsen burner flame for 30 minutes. Matrix A displays a nearly perfect form-stability, particularly in the flame zone. Only the phenol resin foam material present between the particles of exfoliated clay burn slowly. The exfoliated clay particles present in the flame zone, however, rigidly adhere to one another both during the exposure to the flame and after cooling of the test sample.

The same burning test is carried out with matrix B, and it is found that after the phenol resin foam enclosing the exfoliated clay particles burns away, particularly in the flame zone, and that the exfoliated clay particles, no longer bound together by the phenol resin, are precipitated out of the test sample, thereby producing therein a crater-like cavity. After cooling of the sample, it is found that the exfoliated clay particles positioned at the surface of the crater have no bond whatsoever to connect them with the non-burned and non-coked total matrix of the test sample.

EXAMPLE V

In a mixer, there is intimately mixed 28 kg. of swelling (exfoliated) clay (screen fraction, 10–15 mm.) with a 65% alcoholic solution containing 4.2 kg. of a novolak-hexamethylenetetramine mixture (12% by weight of hexamethylenetetramine, based on the amount of the novolak) and 2.05 kg. of a technical phenyl borate (reaction product of phenol and boric acid) of the general formula $BO_x(OC_6H_5)_y$, wherein $x \geq 0$ and $y > 1$ to $\leq 3$, with an average molecular weight of 206. This mixture is then filled into a box-shaped mold, open at the top, and cured in a heating oven at 160° C. within 30–120 minutes. The curing time, in this connection, is dependent upon the geometrical configuration of the molded body formed from the mixture and upon the air circulation in the heating furnace (provided for removing the alcohol vapors). The compression strength of a test body having an edge length of 10 cm., made from this shaped body, is on the average of 6.8 kp./cm.² Identical test bodies are subjected for 30 minutes to a solid non-luminous Bunsen burner flame. They are dimensionally stable during and after the firing test and exhibited after cooling a medium compressive strength of 2.2 kp./cm.².

EXAMPLE VI

In a mixer, there is intimately mixed 28 kg. of swelling (exfoliated) clay (screen fraction, 10–15 mm.) with an alcoholic solution containing 2.05 kg. of a technical phenyl borate (reaction product of phenol and boric acid) of the general formula $BO_x(OC_6H_5)_y$, wherein $x \geq 0$ and $y > 1$ to $\leq 3$, with an average molecular weight of 206. The concentration of this solution is adjusted so that the surface of the substances to be enveloped is, on the one hand, flawlessly wetted and, on the other hand, there is no dripping away of the secondary binder. Subsequently thereto, the thus-wetted product is enveloped by a 60–65% alcoholic solution containing 4.2 kg. of a novolak-hexamethylenetetramine mixture (12% by weight of hexamethylenetetramine, based on the amount of novolak). In this connection, it would readily have been possible to provide an intermediate drying step after application of the secondary binder. The thus twice-enveloped product is then filled into a box-shaped mold open at the top, and cured in a heating oven at 160° C. within 30–120 minutes. The curing time, in this connection, is dependent upon the geometrical configuration of the molded body formed from the mixture and upon the air circulation in the heating furnace (provided for removing the alcohol vapors). The compression strength of a test body having an edge length of 10 cm., made from this shaped body, is on the average 6.8 kp./cm.² Identical test bodies are subjected for 30 minutes to a solid non-luminous Bunsen burner flame. They are dimensionally stable during and after the firing test and exhibited after cooling a medium compressive strength of 2.2 kp./cm.².

Triphenyl borate (for which $x=0$ and $y=3$ in the indicated formula) may also be employed as the inorganic binder. However, since this substance is relatively expensive, it is more practical to use a technical product such as that described in Examples V and VI.

The compressive strength has been denoted in the examples in the unit "kp./cm.." In accordance with the DIN (German Industrial Standard) regulations, the unit of force is the "kilopond" (kp.), whereas the "kilogram" (kg.) is only used as the unit for mass.

It is to be understood that the principles of the present invention may be applied to the oxide-containing inorganic particles having grain sizes of at least 1 mm. and up to, for example, 50 mm., preferably 5–30 mm., and to the synthetic resin binders therefor which are conventionally utilized in the building or construction materials art and to the structural matrices employed therein. In addition, it is to be understood that the particular shape of these matrices is not critical, and they may be rods, blocks, solid molded parts, etc., each exhibiting the particle-to-particle engagement described hereinabove.

The alkali metal silicates to be employed in the process of the present invention include sodium and potassium silicate. The esters of silicic acid which may be employed include, for example, the lower alkyl esters thereof such as methyl, ethyl, propyl, isopropyl, butyl, s-butyl, i-butyl and t-butyl. Sodium and potassium borate are suitable boric acid salts which may be employed. The boron-containing synthetic resins to be utilized include, for example, phenol, urea or epoxy resins containing chemically bound boron.

The invention being thus described, it will be obvious that the same may be varied in many ways. Such variations are not to be regarded as a departure from the spirit and scope of the invention and all such modifications are intended to be included within the scope of the following claims.

We claim:
1. A structural matrix, which comprises:
   a packed aggregation of oxide-containing inorganic particles selected from the group consisting of porous or artifically expanded mineral substances, each of said particles contacting at least one other particle of said aggregation thereof, and each particle having a grain size of from about 1 to about 50 mm.;
   a high temperature binder material in contact with and encompassing each particle, said high temperature binder material containing chemically bound boron or an inorganic silicon compound capable of reacting with said particles at elevated temperatures;
   and a low temperature synthetic thermosetting resin binder material intersticially disposed in said packed aggregation, said low temperature binding material filling the interstices in said aggregation to bind said particles in place, and thereby forming a structural matrix.

2. A structural matrix as set forth in claim 1, wherein said oxide-containing inorganic particles have a grain size of from about 5 to 30 mm.

3. A structural matrix, which comprises:
   an array of particles having a grain size between 1 and 50 mm. and comprising at least one heat-resistant and form-stable, exfoliated, low density, oxide-containing inorganic mineral substance, each of said particles of said array thereof contacting at least one other particle;
   a heat stabilizing agent containing chemically bound boron or an inorganic silicon compound substantially encompassing each particle; and
   a synthetic thermosetting resin binder material disposed in the spaces between said particles, said binder material engaging said particles in their positions in said array, and thereby fixing the dimensions of the structural matrix.

4. The structural matrix set forth in claim 3, wherein said heat stabilizing agent is selected from the group consisting of alkali metal silicates, silic acid esters, triphenyl borate and boric acid and the salts thereof.

5. The structural matrix set forth in claim 3, wherein the grain sizes of said particles are from about 5 to 30 mm.

6. A structural matrix as set forth in claim 3, wherein said particles comprise at least one heat-resistant and form-stable substance selected from the group consisting of exfoliated clay, exfoliated mica, exfoliated pumice, exfoliated slate and exfoliated perlite.

7. The structural matrix set forth in claim 6, wherein said synthetic thermosetting resin binder is characterized by the ability to be foamed.

8. A structural matrix, which comprises:
an array of particles having a grain size of from about 1 to 50 mm. and comprising at least one heat-resistant and form-stable, exfoliated, low density, oxide-containing inorganic mineral substance, each of said particles of said array thereof contacting at least one other particle,
a heat stabilizing agent coated on said particles and bridged across each particle-to-particle contact site, said agent containing a chemically bound boron or silicon compound selected from the group consisting of alkali metal silicates, silicic acid esters, triphenyl borate and boric acid and the salts thereof; and
a synthetic thermosetting resin binder material intersticially disposed between said coated particles and in binding engagement therewith, said resin binder securing said particles in said array, and thereby forming a structural matrix.

9. The structural matrix set forth in claim 8, wherein said particles comprise at least one heat resistant substance selected from the group consisting of exfoliated clay, exfoliated mica, exfoliated pumice, exfoliated slate and exfoliated perlite, wherein said grain sizes ranges from about 5 to 30 mm., and wherein said synthetic resin binder is foamable.

10. A process for forming a heat-stable structural matrix which comprises:
coating a plurality of oxide-containing inorganic particles, said particles being selected from the group consisting of porous and artifically expanded mineral substances, with a heat stabilizing substance which contains chemically bound boron or inorganic silicon compounds and which is capable of reacting with said particles at elevated temperatures;
forming a packed array of said coated particles to interpose said heat stabilizing substance between the surfaces of mutually engaged particles, and to leave interspaces between said particles in said array thereof; and then
filling said interspaces with a synthetic thermosetting resin binding material to secure said coated particles in place.

11. A method as set forth in claim 1, wherein said heat stabilizing substance is selected from the group consisting of alkali metal silicates, silicic acid esters, triphenyl borate and boric acid and the salts thereof.

12. A process for forming a heat stable structural matrix, which comprises:
wetting a plurality of non-uniformly sized particles, having a minimum grain size of at least 1 mm. and a maximum grain size of about 50 mm., with a heat stabilizing agent selected from the group consisting of alkali metal silicates, silicic acid esters, triphenyl borate and boric acid and the salts thereof, said particles comprising at least one heat-resistant, exfoliated substance selected from the group consisting of exfoliated clay, exfoliated mica, exfoliated slate, exfoliated pumice and exfoliated perlite;
positioning the wetted particles into a packed array to engage the heat stabilizing agent on any given particle with the heat stabilizing agent on any particle in mutual engagement therewith, and to separate by interstitial voids, the particles and portions thereof which are not mutually engaged; and then
filling said interstitial voids with a synthetic thermosetting resin binding material to fixedly secure said particles in place and thereby form a structural matrix.

13. A process for forming a heat stable structural matrix, wherein heat-resistant and form-stable, exfoliated, oxide-containing inorganic mineral particles having a minimum grain size of at least 1 mm. and a maximum grain size of about 50 mm. are bound in an array by a synthetic thermosetting resin binding material and wherein a heat stabilizing agent, containing chemically bound boron or an inorganic silicon compound selected from the group consisting of alkali metal silicates, silicic acid esters, triphenyl borates and boric acid and the salts thereof, is included in the matrix comprising
first, wetting said particles with said heat stabilizing agent; then
forming a packed aggregate of the wetted particles to mutually engage each wetted particle with at least one other wetted particle, and then
filling the voids between said packed particles with said synthetic thermosetting resin binding material, without disturbing the mutual contact between said wetted particles to secure said particles in place.

14. A process for forming a heat stable structural matrix comprising,
admixing a plurality of heat stable particles having a grain size from about 1 to 50 mm. and comprising at least one heat-resistant and form-stable, oxide-containing inorganic substance selected from the group consisting of exfoliated clay, exfolicated mica, exfoliated pumice, exfoliated slate and exfoliated perlite, with a heat stabilizing agent containing chemically bound boron or an inorganic silicon compound selected from the group consisting of alkali metal silicates, silicic acid esters, triphenyl borate and boric acid and the salts thereof, to coat said particles with a layer of said heat stabilizing agent,
then admixing said agent coated particles with a synthetic thermosetting resin binder material to form a layer of said resin material on said heat stabilizing agent layer, and then
pressing said coated particles together until said resin and said heat stabilizing agent layers are pressed aside and there exists random particle-to-particle contact.

15. A process for forming a structural matrix, comprising:
coating a plurality of heat-resistant and form-stable oxide-containing inorganic particles selected from the group consisting of exfoliated clay, exfoliated mica, exfoliated pumice, exfoliated slate and exfoliated perlite, with a heat stabilizing agent containing chemically bound boron or an inorganic silicon compound capable of reacting with said particles at elevated temperatures, then
applying a second coating to the heat stabilizing agent coated particles, said second coating comprising a synthetic thermosetting resin binding material, and then
forcing the twice coated particles together to push the coatings aside at random points at which any given particle mutually engages another particle, and to bind said particles together into a structural matrix.

References Cited

UNITED STATES PATENTS

| | | | |
|---|---|---|---|
| 2,163,678 | 6/1939 | Gundlach. | |
| 2,623,866 | 12/1952 | Twiss et al. | 260—37 |
| 3,002,857 | 10/1961 | Stalege | 117—126 |
| 3,024,215 | 3/1962 | Freeman et al. | 260—41 |
| 2,956,893 | 10/1960 | Houston et al. | 206—67 |

FOREIGN PATENTS 798,915  7/1958  Great Britain.

MORRIS LIEBMAN, Primary Examiner

L. T. JACOBS, Assistant Examiner

U.S. Cl. X.R.

260—39; 117—70

UNITED STATES PATENT OFFICE
CERTIFICATE OF CORRECTION

Patent No. 3,510,446   May 5, 1970

Hans Jünger et al.

It is certified that error appears in the above identified patent and that said Letters Patent are hereby corrected as shown below:

In the heading to the printed specification, between lines 9 and 10, insert -- Claims priority, application Germany, Jan. 19, 1965, D 46,289 --.

Signed and sealed this 5th day of January 1971.

(SEAL)
Attest:

Edward M. Fletcher, Jr.
Attesting Officer

WILLIAM E. SCHUYLER, JR.
Commissioner of Patents